US012247536B2

(12) United States Patent
Kennedy et al.

(10) Patent No.: US 12,247,536 B2
(45) Date of Patent: Mar. 11, 2025

(54) ENGINE INTAKE MANIFOLD

(71) Applicant: RB Distribution, Inc., Colmar, PA (US)

(72) Inventors: Patrick Kennedy, Hatboro, PA (US); Joshua Bloch, Eagleview, PA (US); Krisztian Toth, Clarkston, MI (US); Daniel Olson, Ann Arbor, MI (US); Timothy Collins, Oxford, MI (US)

(73) Assignee: RB Distribution, Inc., Colmar, PA (US)

( * ) Notice: Subject to any disclaimer, the term of this patent is extended or adjusted under 35 U.S.C. 154(b) by 0 days.

(21) Appl. No.: 18/779,509

(22) Filed: Jul. 22, 2024

(65) Prior Publication Data

US 2025/0035078 A1 Jan. 30, 2025

Related U.S. Application Data

(60) Provisional application No. 63/516,251, filed on Jul. 28, 2023.

(51) Int. Cl.
*F02M 35/10* (2006.01)
*F02M 26/20* (2016.01)
*F02M 35/104* (2006.01)

(52) U.S. Cl.
CPC .......... *F02M 35/104* (2013.01); *F02M 26/20* (2016.02)

(58) Field of Classification Search
CPC ............................. F02M 35/104; F02M 26/00
See application file for complete search history.

(56) References Cited

U.S. PATENT DOCUMENTS

2016/0298575 A1* 10/2016 Chaput .................. F02M 26/47
2020/0063699 A1* 2/2020 Yang .................. F02M 35/1038
2020/0131999 A1 4/2020 Yamaguchi et al.

FOREIGN PATENT DOCUMENTS

CN 204126783 U 1/2015
EP 3255273 B1 8/2018
KR 20000021270 U 12/2000
KR 20160001768 A 1/2016

* cited by examiner

*Primary Examiner* — Xiao En Mo
(74) *Attorney, Agent, or Firm* — Volpe Koenig

(57) ABSTRACT

An intake manifold includes a body member defining an interior chamber having an upper surface and a perimeter wall depending therefrom and extending to a perimeter edge, which extends in a plane. An air intake port extends through the body member and opens into the interior chamber. An EGR tube extends through an EGR tube port in the body member and the EGR tube opens into the interior chamber. A MAP sensor extends through a MAP port in the body member such that an interior portion of the MAP sensor is positioned in the interior chamber and extends from an interior surface of the body member upper surface by a first distance. A shield member includes a shield wall that depends from the interior surface of the upper surface by a distance larger than the first distance and defines a shielded area about the interior portion of the MAP sensor.

20 Claims, 16 Drawing Sheets

ENGINE INTAKE MANIFOLD

This application claims the benefit of U.S. Provisional Appln. No. 63/516,251, filed Jul. 28, 2023, the contents of which are incorporated herein by reference.

BACKGROUND

Many modern engines have intake manifolds that include multiple ports for components that are part of the fuel delivery system. This is especially true in engines that are electronically controlled and use fuel injection in place of a carburetor.

One component requiring a port is the exhaust gas recirculation (EGR) tube. The EGR tube works by recirculating a portion of an engine's exhaust gas back to the engine cylinders. The exhaust gas displaces atmospheric air and reduces $O_2$ in the combustion chamber. Reducing the amount of oxygen reduces the amount of fuel that can burn in the cylinder thereby reducing peak in-cylinder temperatures. The actual amount of recirculated exhaust gas varies with the engine operating parameters.

Another component requiring a port is the engine throttle body. On a fuel-injected engine, the throttle body is normally located between the air filter and the intake manifold, and is connected to the gas pedal mechanically with a cable, or electronically by wire. When the driver presses the pedal, the butterfly valve in the throttle body pivots to let more air flow into the manifold. The throttle position sensor then alerts the engine control unit (ECU) and the airflow sensor detects a greater flow and sends a message to the car's computer to boost the fuel supply from the injectors.

Another component typically used with fuel injected engines is the manifold absolute pressure (MAP) sensor. The MAP sensor is one of the sensors used in an internal combustion engine's electronic control system. The MAP sensor provides instantaneous manifold pressure information to the engine's ECU. The data is used to calculate air density and determine the engine's air mass flow rate, which in turn determines the required fuel metering for optimum combustion and influences the advance or retard of the engine's ignition timing.

Proper engine operation requires proper operation of the various components to maintain efficiency and pollution control. A deficiency with the current manifold is the failure to protect the MAP sensor from the harmful effects of exhaust pollutions entering the manifold through the EGR tube. This can result in malfunctions of the engine and/or damage to the manifold itself.

SUMMARY

In at least one embodiment, the present disclosure provides an intake manifold that includes a body member defining an interior chamber having an upper surface and a perimeter wall depending therefrom and extending to a perimeter edge. The perimeter edge extends in a given plane. An air intake port extends through the body member and opens into the interior chamber. An EGR tube extends through an EGR tube port in the body member such that a portion of the EGR tube includes an opening into the interior chamber. A MAP sensor extends through a MAP port in the body member such that an interior portion of the MAP sensor is positioned in the interior chamber and extends from an interior surface of the body member upper surface by a first distance. A shield member includes a shield wall that depends from the interior surface of the upper surface by a distance larger than the first distance and defines a shielded area about the interior portion of the MAP sensor.

DETAILED DESCRIPTION

Figure 1:
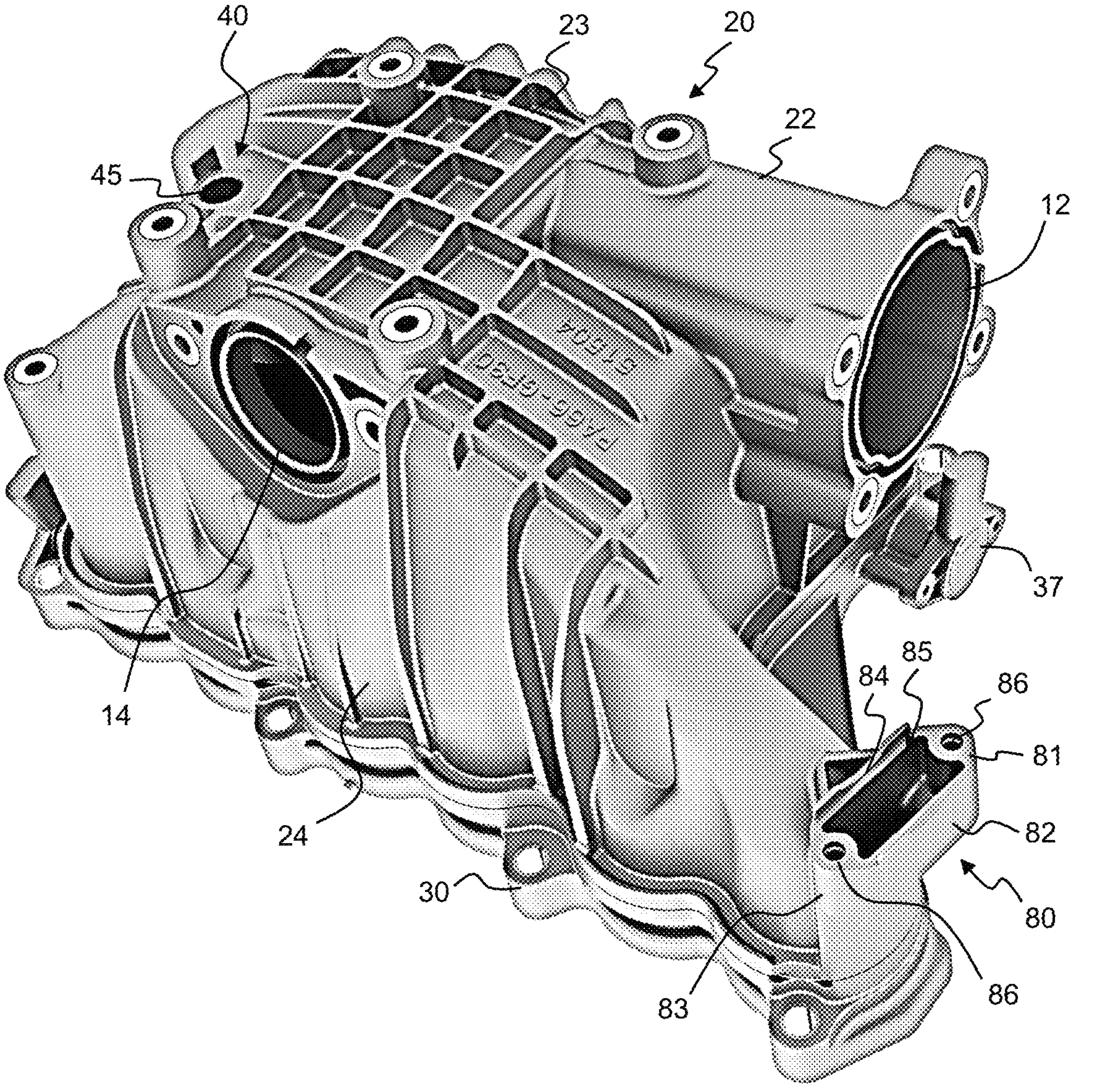
FIG. 1 is a top perspective view of a manifold in accordance with an embodiment of the disclosure showing some of the component ports.
Figure 2:
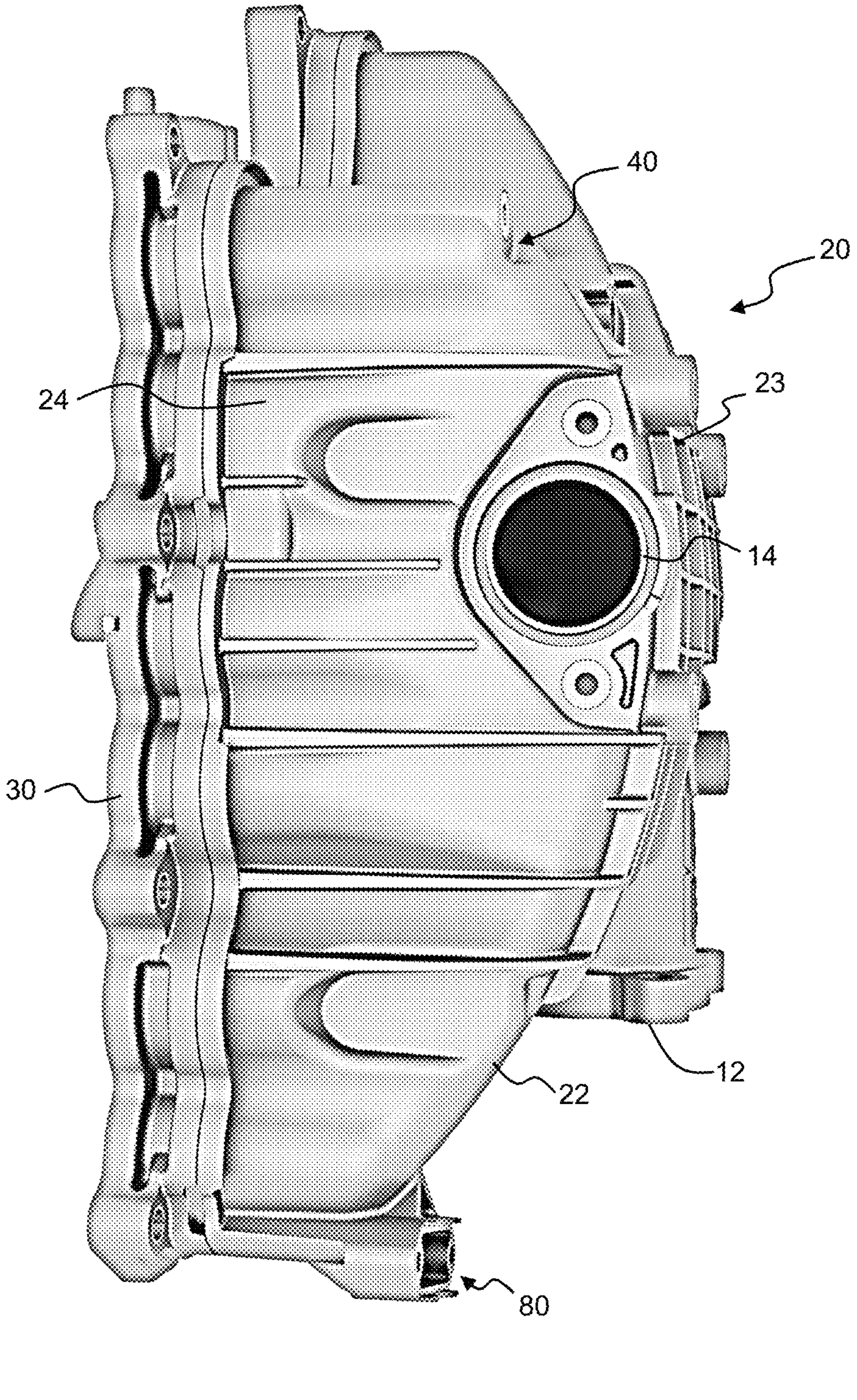
FIG. 2 is a side view showing the port for the exhaust gas recirculation tube.
Figure 3:
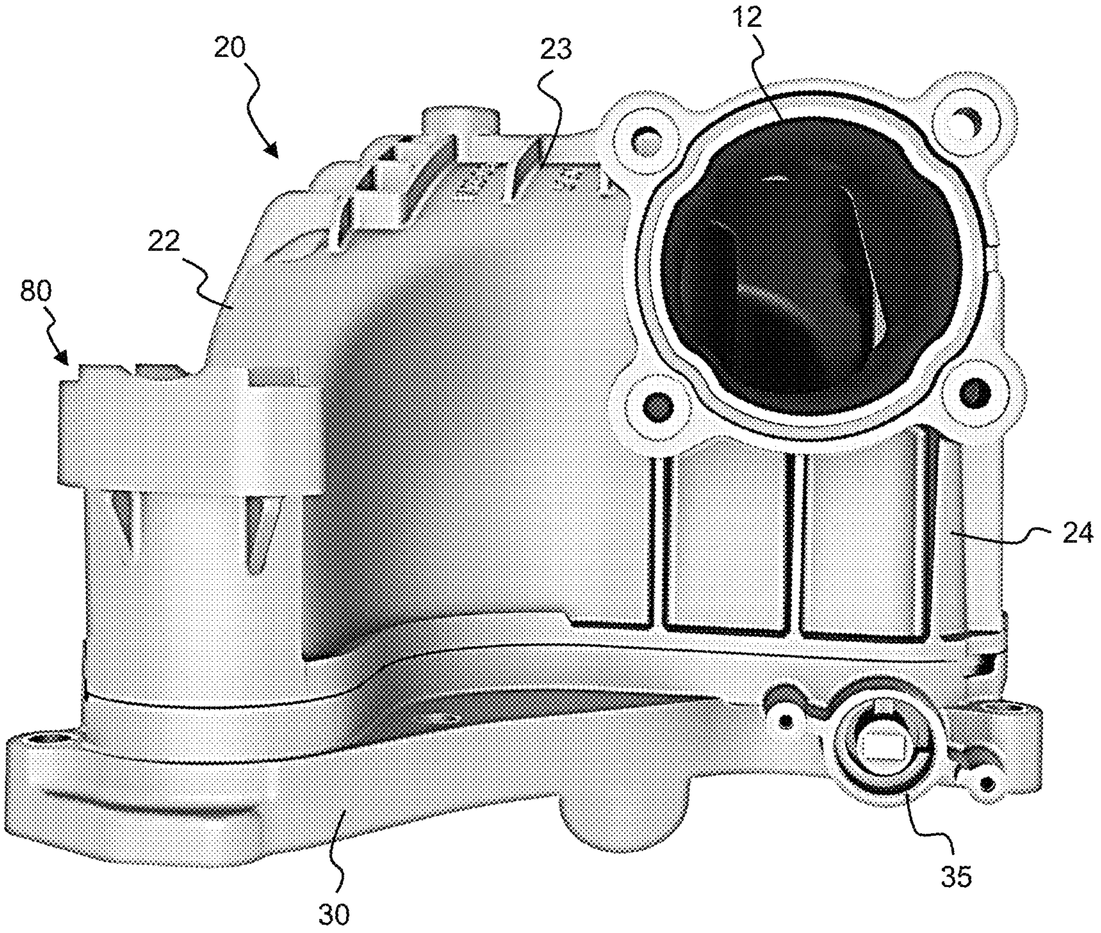
FIG. 3*is* a front view showing the throttle body port.
Figure 4:
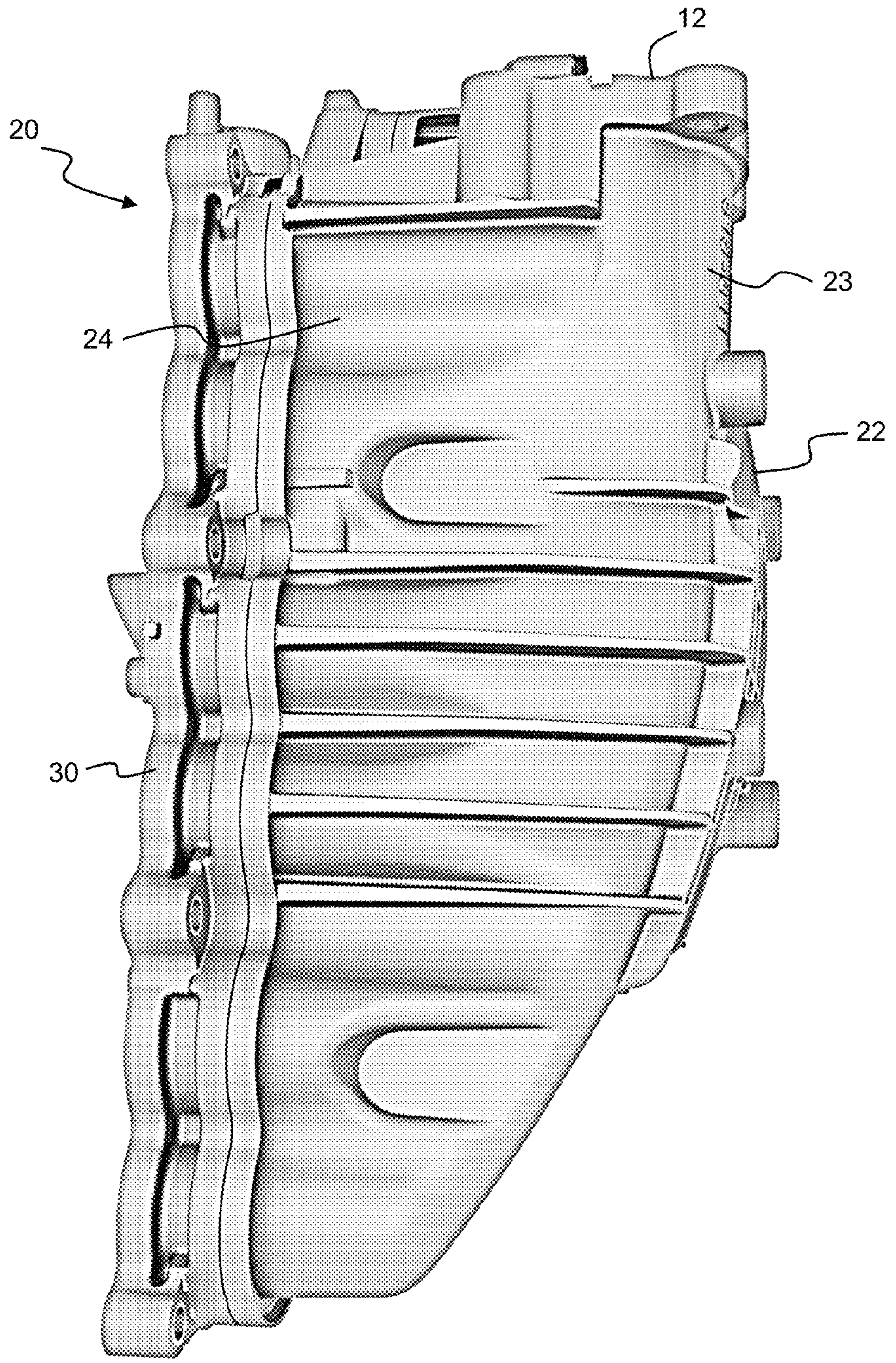
FIG. 4 is a side view of the manifold.

The ensuing detailed description provides exemplary example(s) only, and is not intended to limit the scope, applicability, or configuration of the herein disclosed example(s). Rather, the ensuing detailed description of the exemplary example(s) will provide those skilled in the art with an enabling description for implementing the exemplary examples in accordance with the present disclosure. It should be understood that various changes may be made in the function and arrangement of elements without departing from the spirit and scope of the invention, as set forth in the appended claims.

To aid in describing the disclosure and/or invention as claimed, directional terms may be used in the specification and claims to describe portions of the present disclosure and/or invention (e.g., upper, lower, left, right, etc.). These directional definitions are merely intended to assist in describing the example(s) and claiming the invention, and are not intended to limit the disclosure or claimed invention in any way. In addition, reference numerals that are introduced in the specification in association with a drawing figure may be repeated in one or more subsequent figures without additional description in the specification, in order to provide context for other features.

It should be understood that when an element is referred to as being "connected" or "coupled" to another element, it can be integral with the other element, directly connected or coupled to the other element, or that intervening elements may be present. In contrast, when an element is referred to as being "directly connected" or "directly coupled" to another element, it should be understood that no intervening elements are present. Other words used to describe the relationship between elements should be interpreted in a like fashion (e.g., "between" versus "directly between," "adjacent" versus "directly adjacent," etc.).

Figure 8:
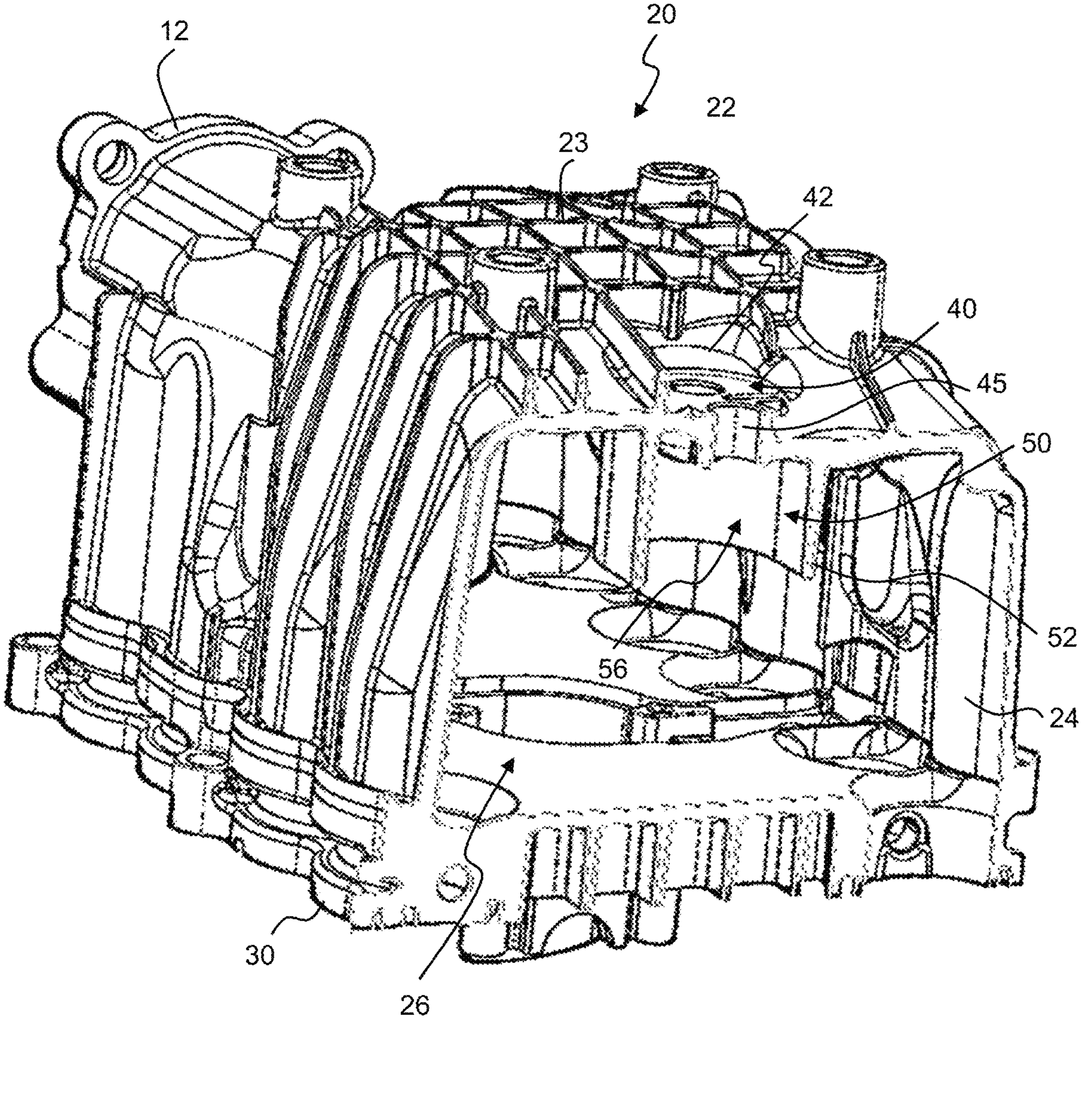
FIG. 8 is a cross-section view along the line 8-8 in FIG. 7.

A manifold 10 in accordance with an embodiment of the disclosure will be described with reference to the figures. Referring to FIGS. 1-13, the manifold 10 generally comprises a body 20 surrounding an interior chamber 26 (see FIG. 8). In the present embodiment, the body 20 is defined by an upper body member 22 and a lower body member 30. The upper body member 22 has a generally domed shaped configuration with an arcuate upper surface 23 and a side wall 24 depending therefrom. The side wall 24 defines a lower perimeter edge 25 (see FIGS. 9 and 11-13) configured to mate with lower body member 30. The upper body member 21 defines an air inlet port 12, an EGR tube port 14, a MAP sensor port 40, and an EGR solenoid mount 80.

Figure 5:
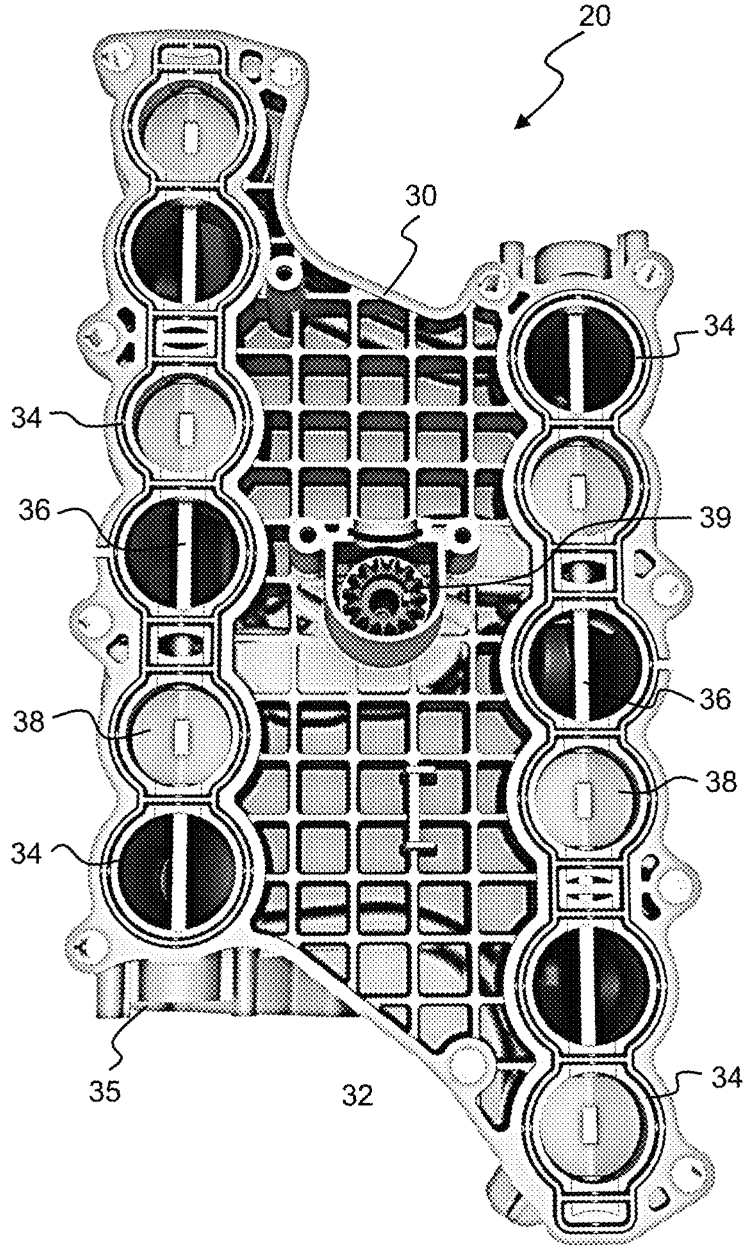
FIG. 5 is a bottom view of the manifold.
Figure 6:
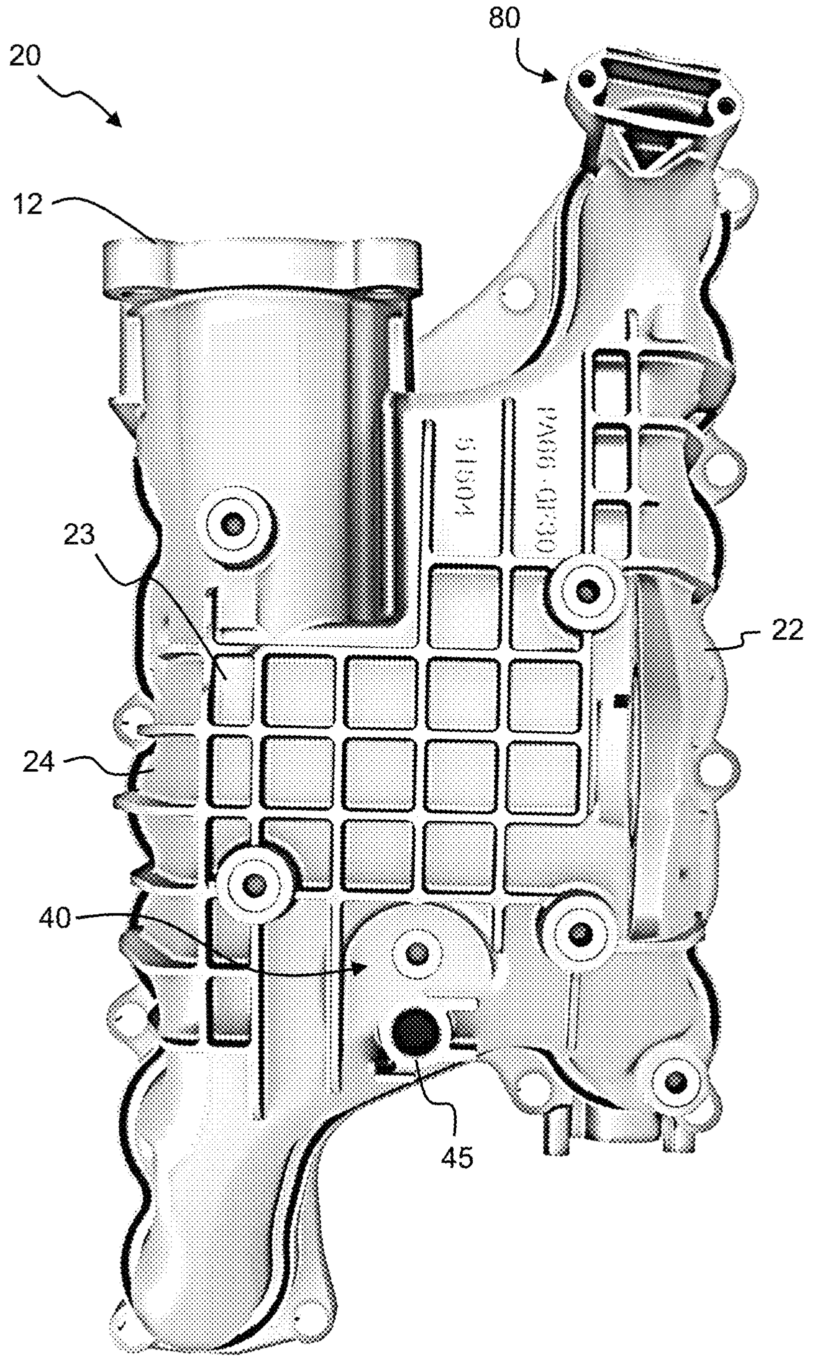
FIG. 6 is a top view of the manifold.
Figure 7:
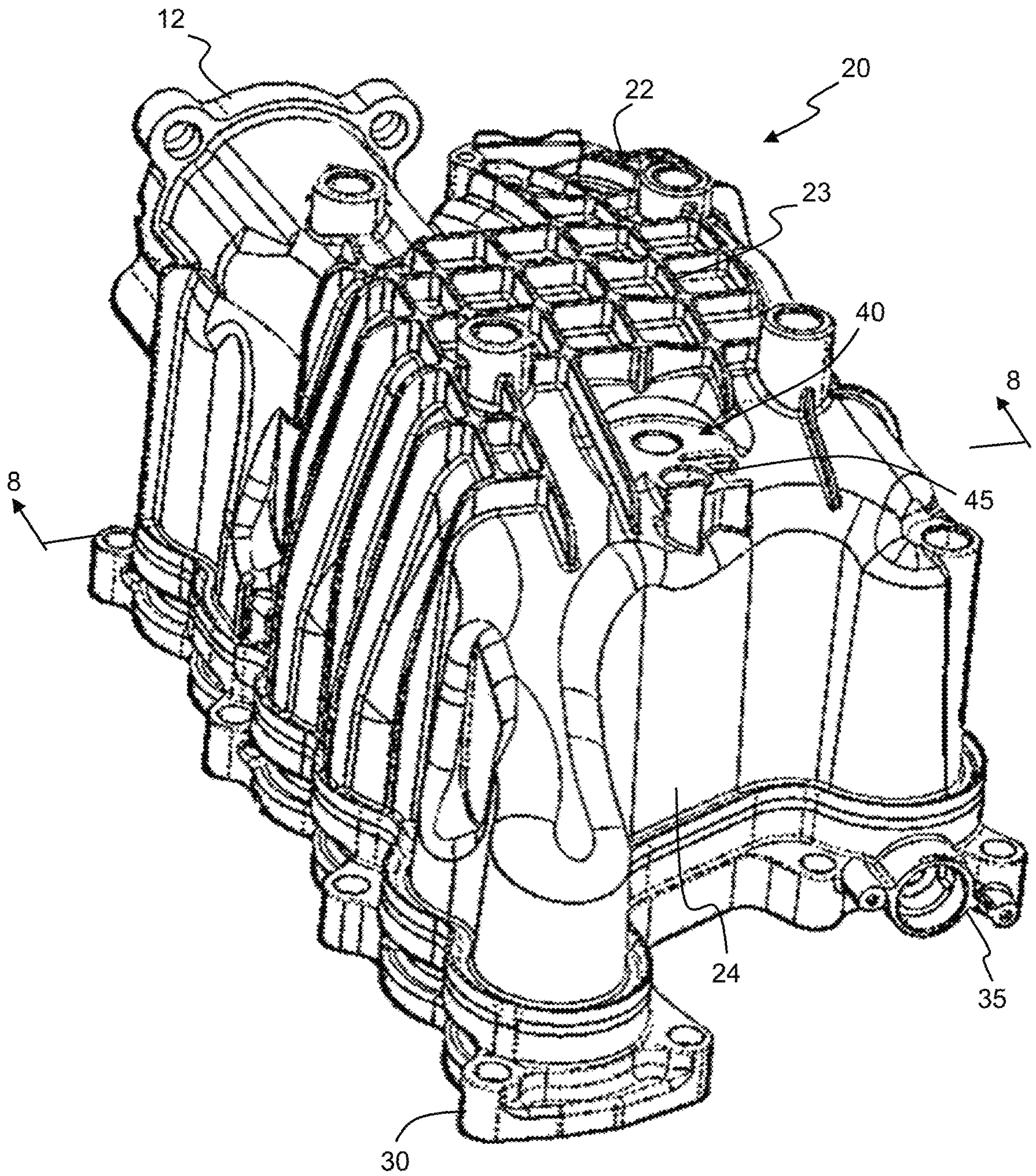
FIG. 7 is a rear view of the manifold.
Figure 10:
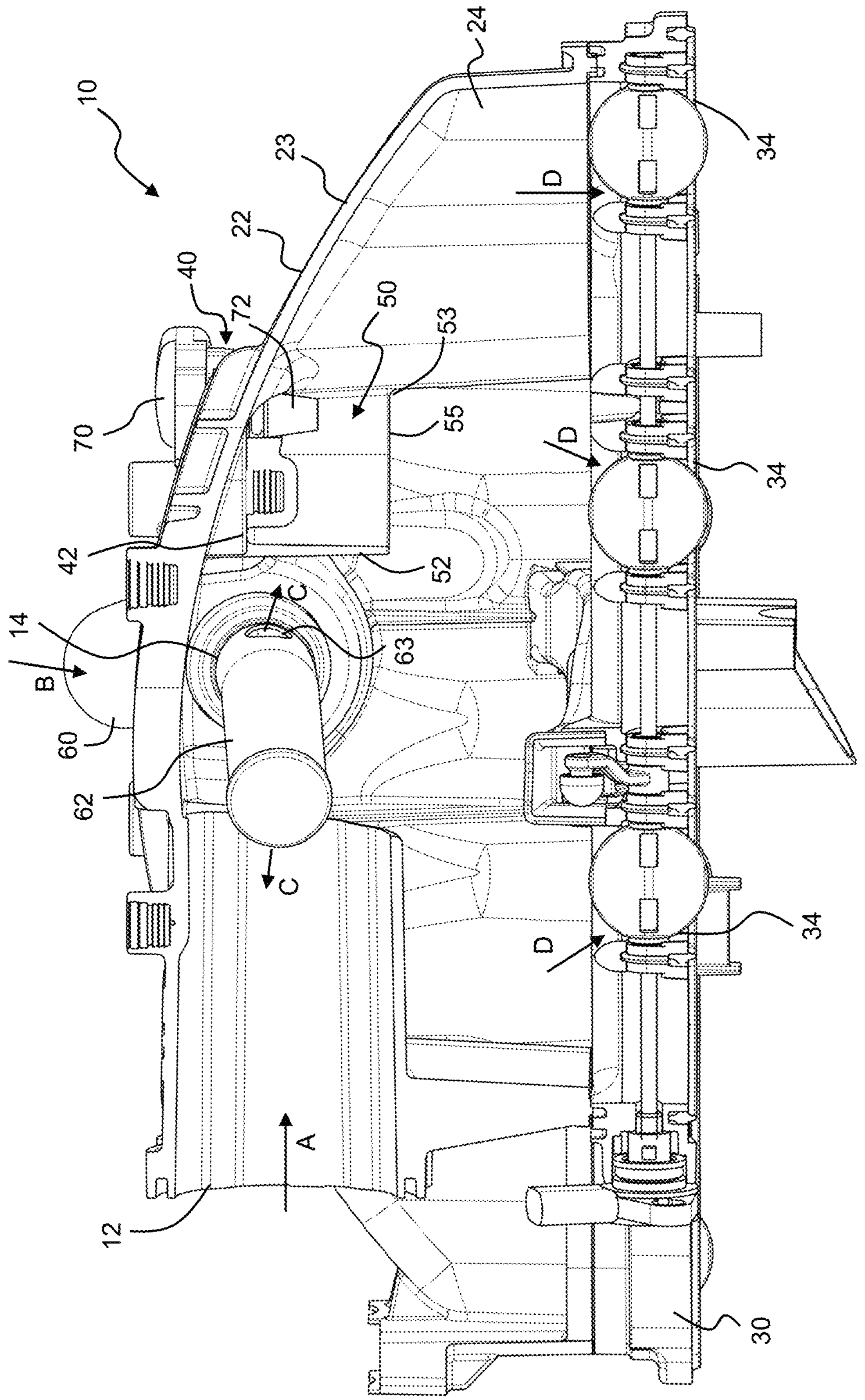
FIG. 10 is a cross-sectional view along a length of the manifold and again illustrating the position of the exhaust gas recirculation tube relative to the MAP sensor and the protective shield.
Figure 11:
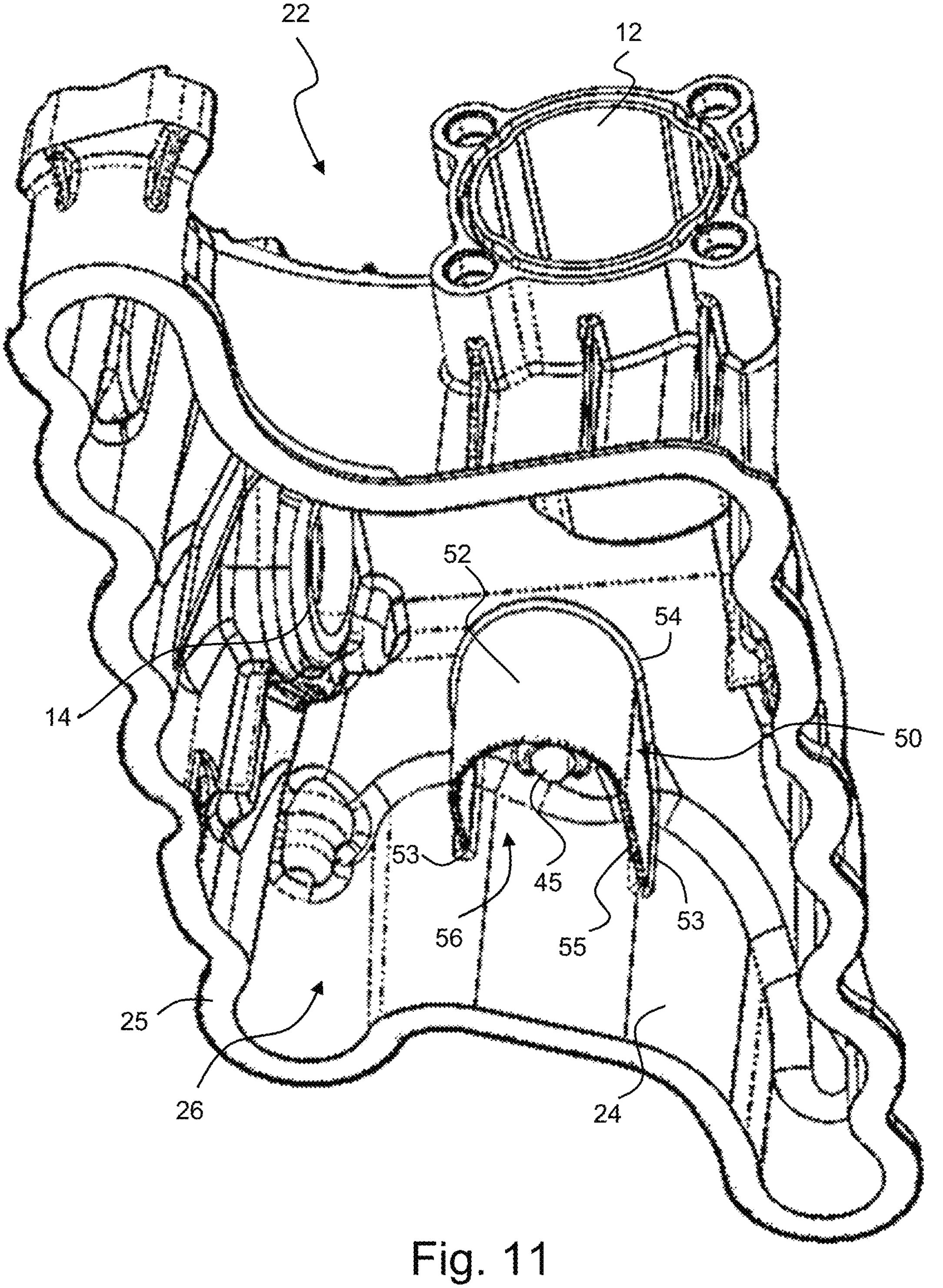
FIGS. 11 and 12 are bottom perspective views and FIG. 13 is a bottom plan view of the manifold with the lower cover removed.
Figure 12:
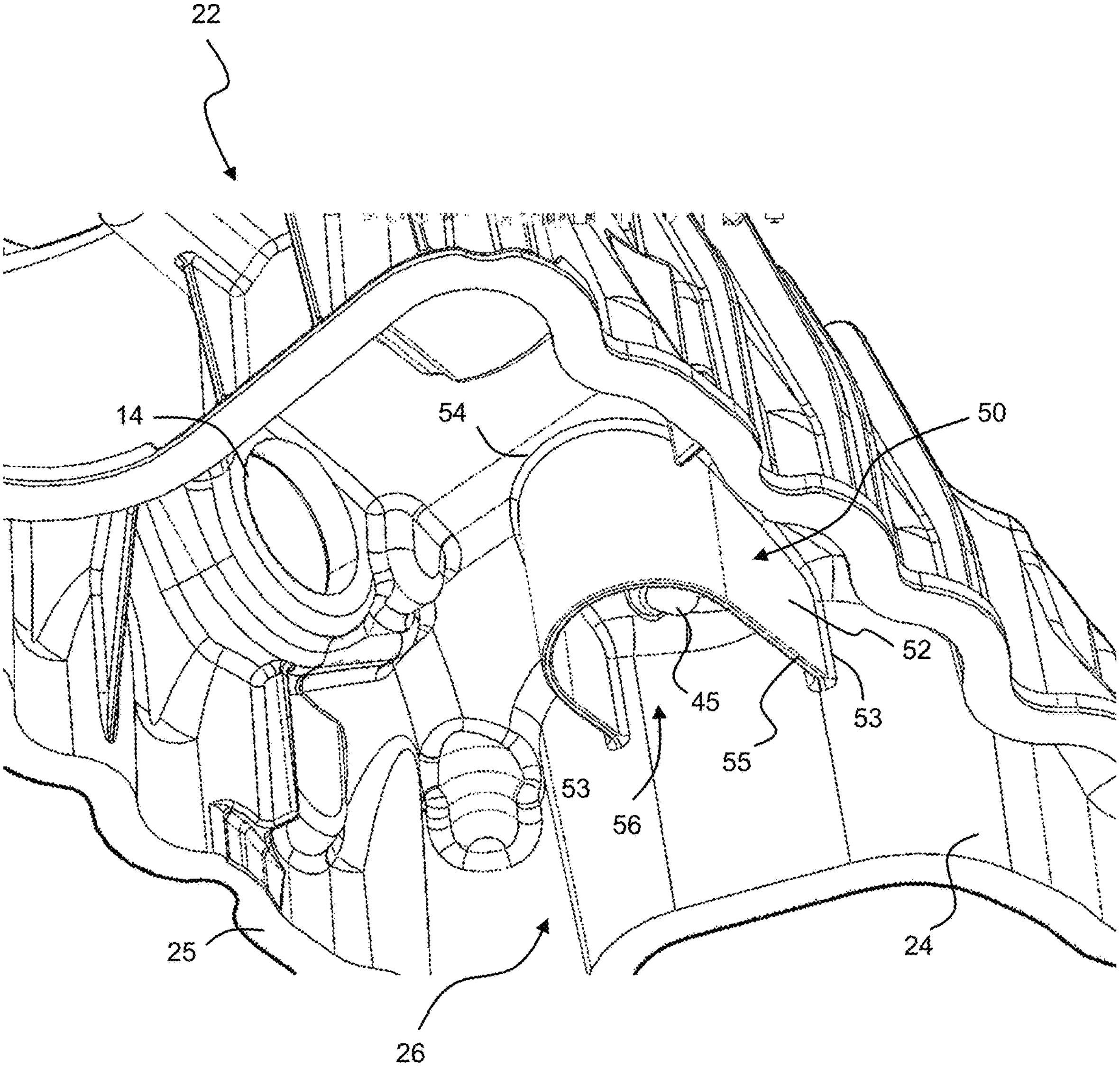
Figure 13:
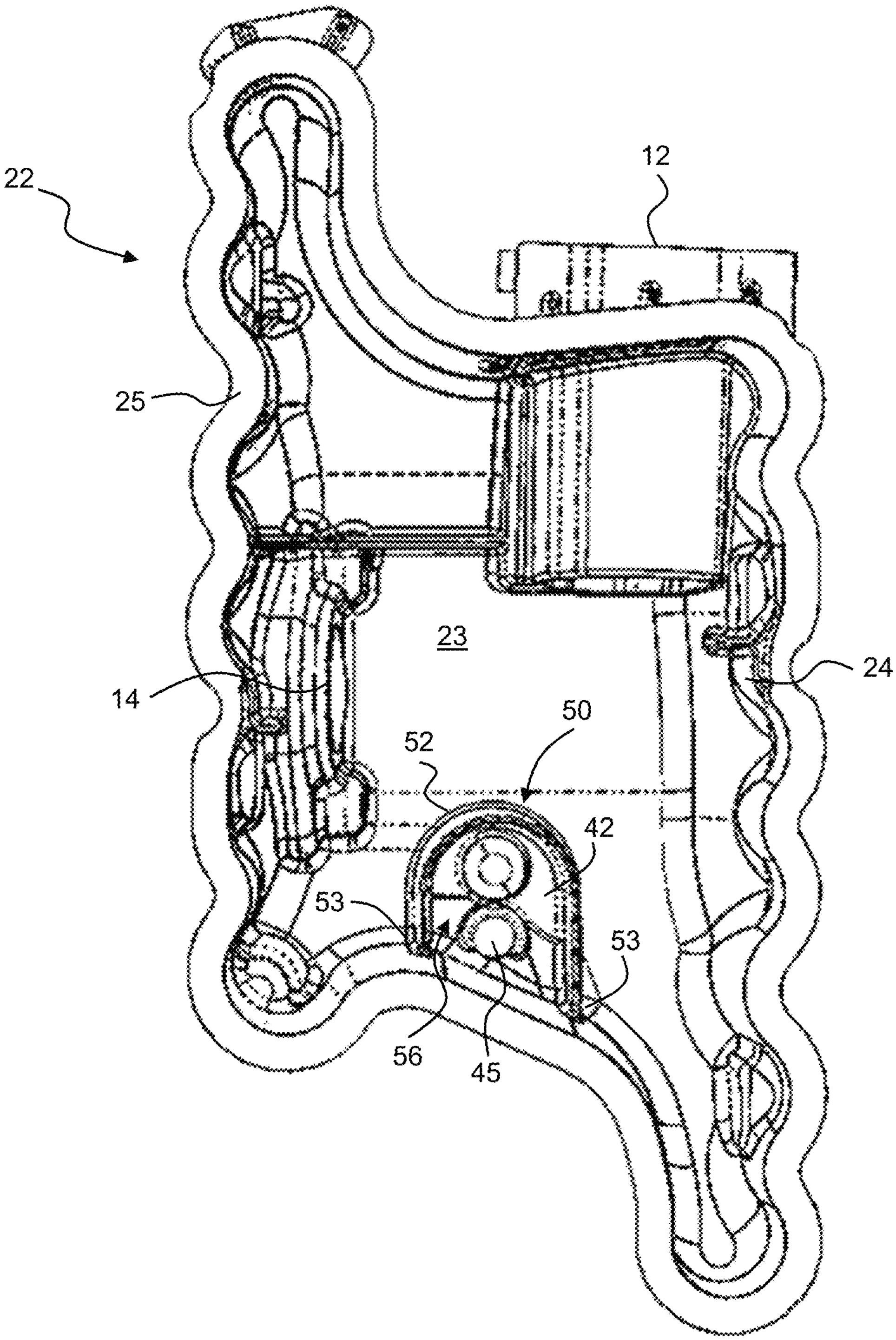

Referring to FIGS. 5 and 10, the lower body member 30 of the present embodiment has a generally planner surface 32 with a plurality of openings 34. Respective shaft 36 and blade 38 assemblies are supported by the lower body member 30 in alignment with the openings 34. The lower body member 30 also defines a mount 35 configured to support a drive 37 in connection with one of the shafts 36. A gear assembly 39 is provided for simultaneous driving of the shafts 36. The general configuration of the manifold described above is known in the art, however, the disclosure herein is not limited to such and may have varying configurations.

Figure 9:
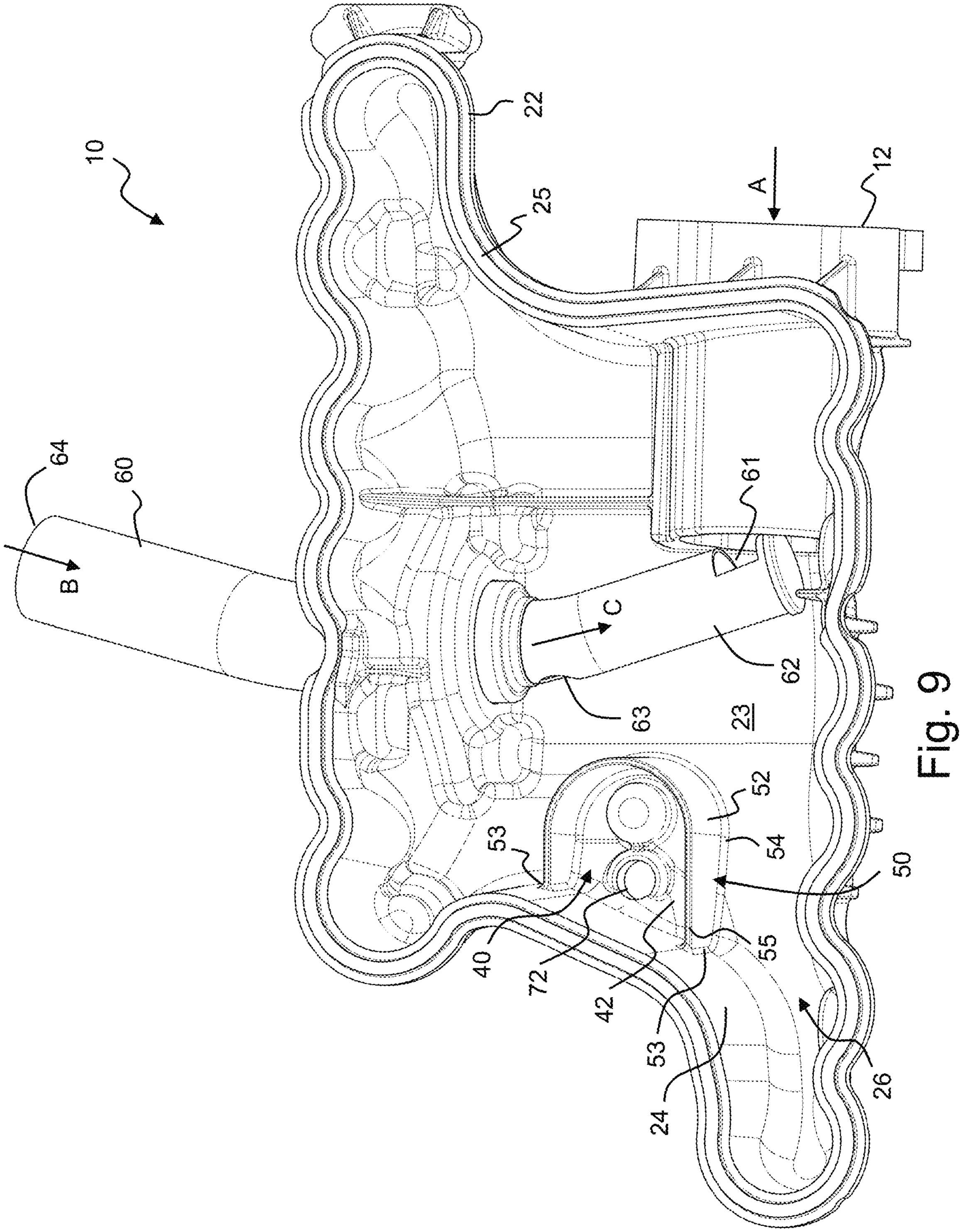
FIG. 9 is a bottom plan view with the lower cover removed and illustrating the position of the exhaust gas recirculation tube relative to the MAP sensor and the protective shield.

Referring to FIGS. 9 and 10, upon assembly, the EGR tube 60 extends through the EGR port 14 and the MAP sensor 70 extends through the MAP port 40. The MAP sensor 70 has an internal portion 72 which extends through an opening 45 in the port 40 and into the interior chamber 26. The EGR tube 60 similarly has an internal portion 62 and an external portion 64. The external portion 64 has an open end 65 configured to receive hot EGR gas (as indicated by arrow B), while the internal portion 62 has a first opening 61 and a second opening 63, both configured to deliver cooled EGR into the chamber 26 (as indicated by arrows C). The first opening 61 is aligned with the air intake port 12 and the second opening 63 is opposite thereto and opens toward the rear of the chamber 26. In operation, fresh air enters the chamber 26 through the air intake port 12 (as indicated by arrow A) and mixes with the cooled EGR gas and then the combined gas exits through the openings 34 (as indicated by arrow D). As the gas circulates in the chamber 26, the internal portion 72 of the MAP sensor 70, senses instantaneous manifold pressure information and provides such to the engine's ECU. The data is used to calculate air density and determine the engine's air mass flow rate, which in turn determines the required fuel metering for optimum combustion and influences the advance or retard of the engine's ignition timing.

To protect the interior portion 72 of the MAP sensor 70 such that the system continues to operate under the extreme conditions, a shield member 50 extends from the inside surface of the upper member 22. In the present embodiment, the shield member 50 includes a U-shaped wall 52 with each of its ends 53 connecting with a rear portion of the side wall 24. The upper edge 54 of the wall 52 is sealingly engaged with the inside surface of the upper surface 23, with the illustrated embodiment formed integral therewith. The lower edge 55 of the wall 52 defines an opening into the shielded area 56. As shown FIGS. 10-11, the height of the wall 52 between the edges 54, 55 is larger than a distance the MAP sensor interior portion 72 extends into the chamber 26. As such, the interior portion 72 is shielded from direct flow from the EGR tube opening 63, but still allows the MAP sensor 70 to sense the manifold pressure. In the illustrated embodiment, the upper body member 22 and the shield member 50 are formed integrally from the same material, however, it is understood that they may formed separately and attached to one another and may be made of different materials.

Figure 14:
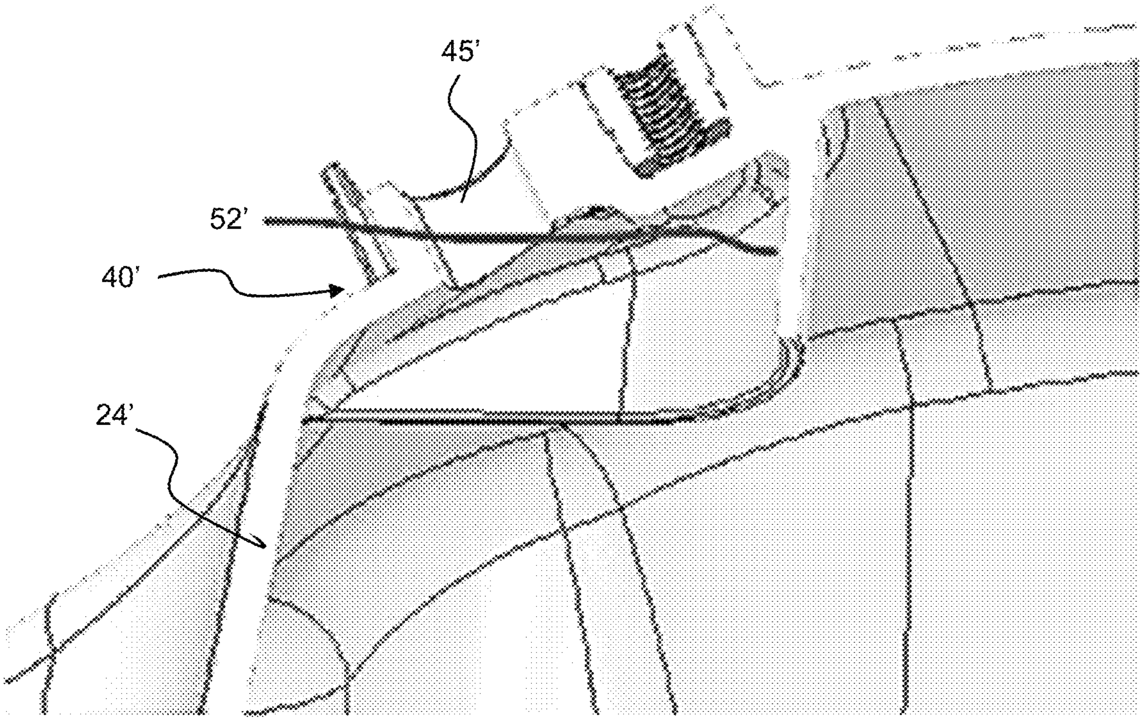
FIG. 14 is a cross-sectional view of the MAP sensor area of a prior art manifold.
Figure 15:
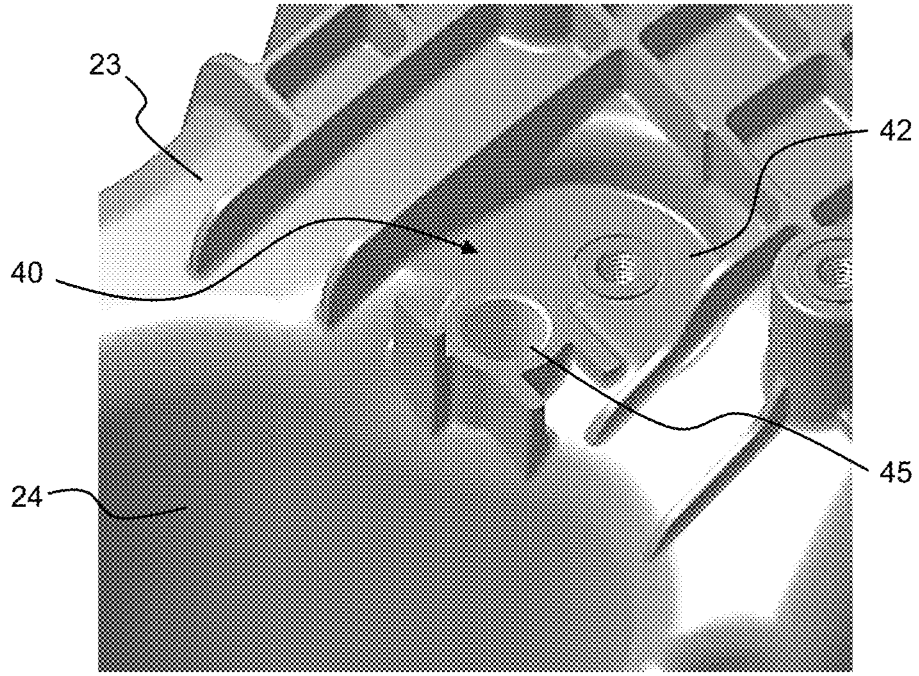
FIGS. 15 and 16 are perspective views of the EGR solenoid mounting area in the manifold of FIG. 1.
Figure 16:
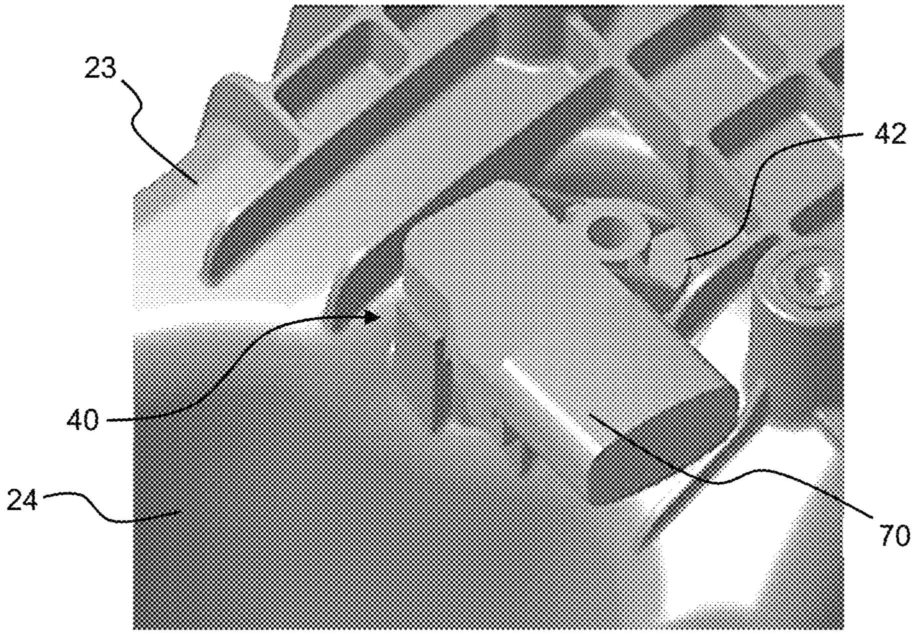

Referring to FIGS. 10 and 15-16, in the illustrated embodiment, the MAP port 40 is defined with a generally planar surface 42 which is generally parallel to the lower body member 30. The sensor opening 45 has a central axis which is generally perpendicular to the surface 42 such that the MAP sensor interior portion 72 and the shield member wall 52 both extend generally perpendicular to the lower body member 30. The shield member wall 52 has a generally constant height between its ends 53. With this configuration, the depth of the of the shielding area 56 is consistent about the sensor 70. By way of comparison, FIG. 14 shows a known mounting arrangement where the sensor port 40' has an angular orientation such that the sensor opening 45' is angled with respect to the lower body member (not shown) and the wall 52' tapers to a zero height adjacent the side wall 24'.

Figure 17:
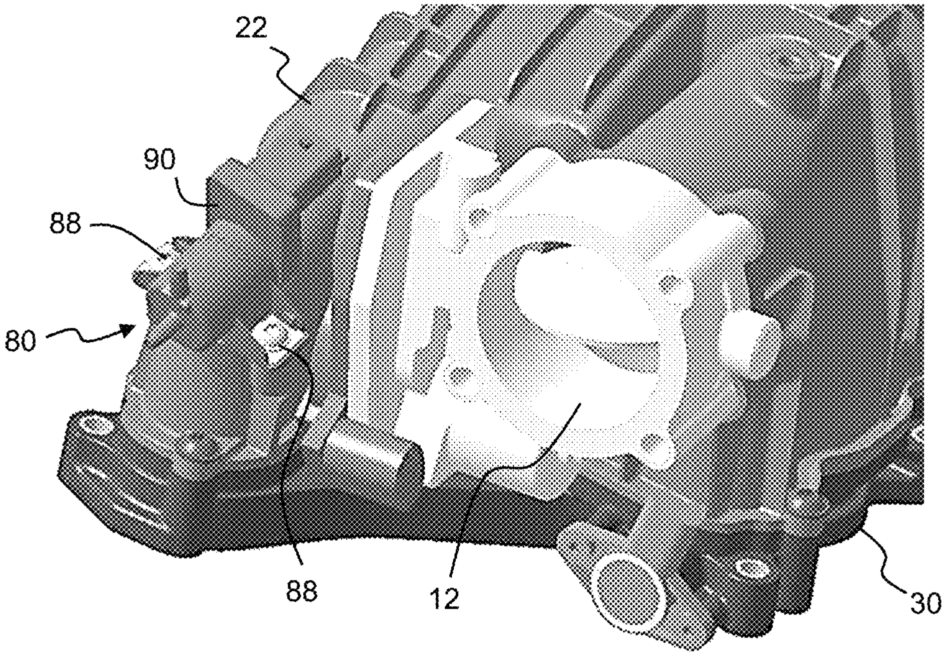
FIGS. 17 and 18 are partial perspective views showing the EGR solenoid mounted to the EGR solenoid mount.
Figure 18:
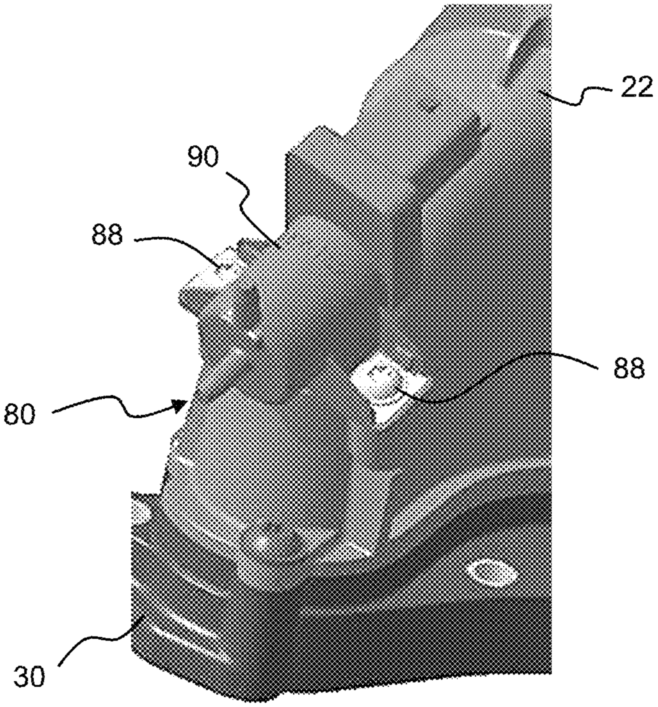

Referring to FIGS. 1 and 17-18, the EGR solenoid mount 80 will be described in more detail. Solenoid 90 is mounted on the manifold upper body 22 and is configured to control EGR flow. The solenoid mount 80 includes opposed walls 82 and 84 with connecting ends 81 and 83. The walls 82, 84 and ends 81, 83 surround an open area 85. The spaced apart walls 82, 84 provide broader support for the solenoid 90. Each of the connecting ends 81, 83 has a screw opening 86 therein. The screw openings 86 may be threaded, for example via a threaded insert, or they may be configured to receive self-tapping screws 88. The solenoid mount 80 provides a secure, reliable mount area for the solenoid 90.

What is claimed is:

1. An intake manifold comprising:

a body member defining an interior chamber having an upper surface and a perimeter wall depending therefrom and extending to a perimeter edge, the perimeter edge extending in a given plane;

an air intake port extending through the body member and opening into the interior chamber;

an EGR tube extending through an EGR tube port in the body member such that a portion of the EGR tube includes an opening into the interior chamber;

a MAP sensor extending through a MAP port in the body member such that an interior portion of the MAP sensor is positioned in the interior chamber and extends from an interior surface of the body member upper surface by a first distance; and a shield member including a shield wall that depends from the interior surface of the upper surface by a distance larger than the first distance and defines a shielded area about the interior portion of the MAP sensor.

2. The intake manifold according to claim 1 wherein the shield wall extends between first and second ends and each of the first and second ends connects to the perimeter wall.

3. The intake manifold according to claim 1 wherein the shield wall extends between first and second ends and has a generally constant height between the ends.

4. The intake manifold according to claim 3 wherein the generally constant height is at least twice the first distance.

5. The intake manifold according to claim 1 wherein the MAP port is defined along a planar portion of the body member upper surface which is generally parallel to the given plane.

6. The intake manifold according to claim 5 wherein the MAP sensor interior portion extends substantially perpendicular to the planar portion.

7. The intake manifold according to claim 1 wherein the EGR tube opening is directed toward the MAP sensor interior portion and the shield member extends in between the EGR tube opening and the MAP sensor interior portion.

8. The intake manifold according to claim 1 further comprising a second body member having a generally planar configuration and secured relative to the body member along the perimeter edge.

9. The intake manifold according to claim 8 wherein the second body member defines a plurality of openings and supports one or more shaft and blade in alignment with the openings.

10. The intake manifold according to claim 1 wherein the shield member is formed integrally with the body member.

11. The intake manifold according to claim 1 wherein the shield member and the body member are formed of the same material.

12. An intake manifold comprising:

a lower body member having a generally planar configuration;

an upper body member connected to the lower body member to define an interior chamber, the upper body member having an upper surface and a perimeter wall depending therefrom;

an air intake port extending through the body member and opening into the interior chamber;

an EGR tube extending through an EGR tube port in the body member such that a portion of the EGR tube includes an opening into the interior chamber;

a MAP sensor extending through a MAP port in the body member such that an interior portion of the MAP sensor is positioned in the interior chamber and extends from an interior surface of the body member upper surface by a first distance; and a shield member including a shield wall that depends from the interior surface of the upper surface by a distance larger than the first distance and defines a shielded area about the interior portion of the MAP sensor.

13. The intake manifold according to claim 12 wherein the shield wall extends between first and second ends and each of the first and second ends connects to the perimeter wall.

14. The intake manifold according to claim 12 wherein the shield wall extends between first and second ends and has a generally constant height between the ends.

15. The intake manifold according to claim 14 wherein the generally constant height is at least twice the first distance.

16. The intake manifold according to claim 12 wherein the MAP port is defined along a planar portion of the body member upper surface which is generally parallel to the lower body member.

17. The intake manifold according to claim 16 wherein the MAP sensor interior portion extends substantially perpendicular to the planar portion.

18. The intake manifold according to claim 12 wherein the EGR tube opening is directed toward the MAP sensor interior portion and the shield member extends in between the EGR tube opening and the MAP sensor interior portion.

19. The intake manifold according to claim 12 wherein the shield member is formed integrally with the upper body member.

20. The intake manifold according to claim 12 wherein the shield member and the upper body member are formed of the same material.

* * * * *